(12) United States Patent
Wallace

(10) Patent No.: US 8,382,409 B2
(45) Date of Patent: Feb. 26, 2013

(54) DIRECT TENSION MULTI-COLOR INDICATING WASHERS

(75) Inventor: Ivan Wayne Wallace, Walpole, NH (US)

(73) Assignee: Applied Bolting Technology Products, Inc., Rockingham, VT (US)

( * ) Notice: Subject to any disclaimer, the term of this patent is extended or adjusted under 35 U.S.C. 154(b) by 155 days.

(21) Appl. No.: 12/780,145

(22) Filed: May 14, 2010

(65) Prior Publication Data

US 2011/0123288 A1 May 26, 2011

Related U.S. Application Data

(60) Provisional application No. 61/179,488, filed on May 19, 2009.

(51) Int. Cl.
*F16B 31/02* (2006.01)

(52) U.S. Cl. .............................. 411/13; 411/9

(58) Field of Classification Search .................. 411/8, 9, 411/10, 13, 14
See application file for complete search history.

(56) References Cited

U.S. PATENT DOCUMENTS

| | | | |
|---|---|---|---|
| 2,191,101 A | 2/1940 | Stellin | |
| 2,274,010 A | 2/1942 | Stellin | |
| 2,476,561 A | 7/1949 | Pedersen | |
| 2,781,687 A | 2/1957 | Knocke | |
| 2,850,937 A | 9/1958 | Ralston | |
| 2,943,528 A | 7/1960 | Curry | |
| 3,137,268 A | 6/1964 | Hornwood | |
| 3,187,621 A | 6/1965 | Turner | |
| 3,285,120 A | 11/1966 | Kartiala | |
| 3,304,827 A * | 2/1967 | Bush | 411/13 |
| 3,383,974 A * | 5/1968 | Dahl | 411/14 |
| 3,476,009 A | 11/1969 | Markey | |
| 3,788,186 A | 1/1974 | Crites | |
| 3,948,141 A * | 4/1976 | Shinjo | 411/10 |
| 3,960,048 A | 6/1976 | Wagner | |
| 4,020,734 A | 5/1977 | Bell | |
| 4,037,516 A | 7/1977 | Hart | |
| 4,072,081 A | 2/1978 | Curtis et al. | |
| 4,149,446 A | 4/1979 | Spengler et al. | |
| 4,157,052 A | 6/1979 | Kulka | |
| 4,164,164 A * | 8/1979 | Trungold | 411/10 |
| 4,303,001 A * | 12/1981 | Trungold | 411/10 |
| 4,322,193 A | 3/1982 | Stahl | |
| 4,347,024 A | 8/1982 | Coldren | |
| 4,498,825 A | 2/1985 | Pamer et al. | |
| 4,703,711 A | 11/1987 | Haynes | |
| 4,793,757 A | 12/1988 | Peterson | |
| 5,015,132 A | 5/1991 | Turner et al. | |

(Continued)

FOREIGN PATENT DOCUMENTS

| | | |
|---|---|---|
| GB | 1184033 | 3/1970 |
| JP | 52009757 | 1/1977 |

OTHER PUBLICATIONS

PCT International Search Report and Written Opinion of the International Searching Authority for International Patent Application No. PCT/US2010/034846, Jan. 25, 2011, 9 pages.

*Primary Examiner* — Gary Estremsky
(74) *Attorney, Agent, or Firm* — Cantor Colburn LLP

(57) ABSTRACT

A direct tension indicating washer includes a first surface having a plurality bumps formed thereon; a second surface having a plurality of discrete indentations, each indentation formed opposite one of said protuberances; an indicating material positioned in at least one indentation, the indicating material including an indicating material having a first color and an indicating material having a second color; and a channel leading from the at least one indentation to an outer edge of said direct tension indicating washer.

10 Claims, 2 Drawing Sheets

U.S. PATENT DOCUMENTS

| | | |
|---|---|---|
| 5,056,975 A | 10/1991 | Ando |
| 5,088,866 A | 2/1992 | Ischebeck |
| 5,370,483 A | 12/1994 | Hood et al. |
| 5,487,632 A | 1/1996 | Hood et al. |
| 5,667,346 A | 9/1997 | Sharp |
| 5,769,581 A | 6/1998 | Wallace et al. |
| 5,921,737 A | 7/1999 | Ibey |
| 5,931,618 A | 8/1999 | Wallace et al. |
| 6,059,500 A | 5/2000 | Dirmeier et al. |
| 6,152,665 A | 11/2000 | Wallace et al. |
| 6,425,718 B1 | 7/2002 | Herr et al. |
| 6,582,173 B1 | 6/2003 | Miller |
| 6,609,865 B2 | 8/2003 | Daigneault |
| 6,729,819 B2 | 5/2004 | Wallace |
| 6,824,225 B2 | 11/2004 | Stiffler |
| 7,635,243 B2 | 12/2009 | Turner et al. |
| 7,857,562 B2 * | 12/2010 | Wallace ............ 411/10 |
| 8,002,641 B2 * | 8/2011 | Wallace ............ 470/41 |
| 2008/0038076 A1 * | 2/2008 | Turner et al. ............ 411/10 |
| 2008/0138167 A1 | 6/2008 | Wallace |
| 2009/0047060 A1 * | 2/2009 | Turner et al. ............ 403/27 |
| 2009/0232614 A1 * | 9/2009 | Wallace ............ 411/14 |
| 2011/0014986 A1 * | 1/2011 | Wallace ............ 470/41 |

* cited by examiner

FIG. 5
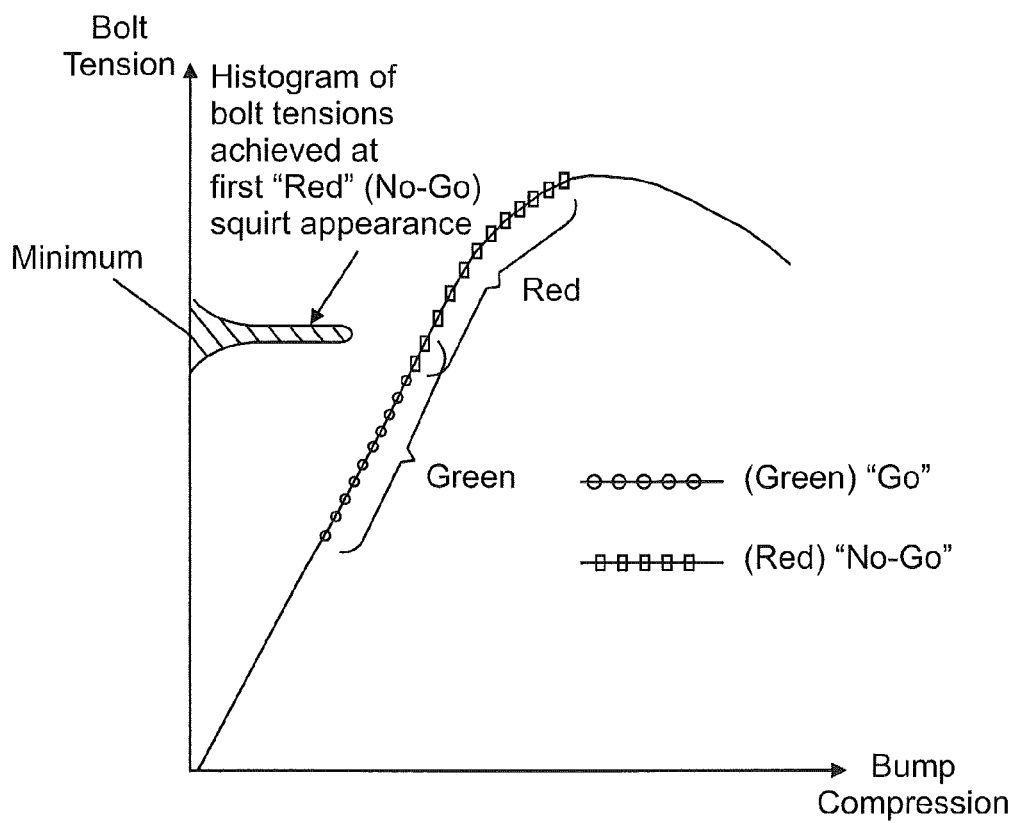
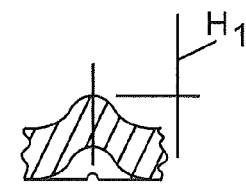
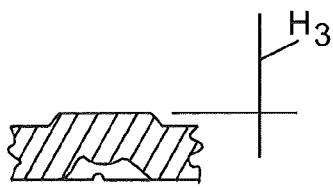
FIG. 5A      FIG. 5B

DIRECT TENSION MULTI-COLOR INDICATING WASHERS

CROSS-REFERENCE TO RELATED APPLICATIONS

This application claims the benefit of U.S. provisional patent application Ser. No. 61/179,488 filed May 19, 2009, the entire contents of which are incorporated herein by reference.

BACKGROUND

The invention relates in general to direct tension indicating washers and in particular to direct tension indicating washers that indicate when the proper bolt tension has been achieved.

Standard DTIs, when compressed to the point where a feeler gage will not enter the residual gap between the top surface of the DTI and the underside of the bolt head or compressing flat washer, will show the installers that they are at a satisfactory point in the bolt's "tension/elongation" curve. However, the determination of adequate DTI bump compression by means of a feeler gage is labor intensive and open to inspection judgment as to whether the feeler gage has been refused or not, to hardware quality variances (such as flat washer hardness), to DTI installation errors (placing the DTI upside down with the bumps against the steelwork instead of against a hardened surface like a flat washer or bolt head), and to problems of hole size variability (where too large a hole allows the standard DTI to collapse into the hole, giving the inspector the impression of feeler gage refusal whereas the "gap" has been closed by means of material, etc.). In addition, the appearance of a compressed DTI is much the same as the appearance of an uncompressed DTI, at least from a modest distance away, and therefore it is imperative that a feeler gage be used to inspect all or virtually all of the DTIs or some bolts will have been missed.

An improvement to the standard non-squirting feeler gage type of DTI is the SQUIRTER DTI, wherein a known quantity of bright orange elastomeric material is deposited under the DTI protrusion, cured, and when the DTI protrusion compresses parallel to the development of bolt tension, eventually the highly visible elastomeric material finds its way out to the outer diameter of the DTI through a small stamped channel in the underside of the DTI. The volume and appearance of the squirted elastomeric material can be related to actual protrusion compression, which is known to be parallel to the development of bolt tension. An exemplary SQUIRTER DTI is disclosed in U.S. Pat. No. 5,931,618, the entire contents of which are incorporated herein by reference.

SQUIRTER DTIs have achieved a strong place in the bolt tensioning marketplace because of their capacity to show relatively unskilled workers that the bolt tension is right, regardless of the torque resistance of the bolt assembly, primarily due to the visible nature of the elastomeric emission. By judging by (first) calibrating the amount of squirted silicone in a known tension bolt calibrator, and then (second) by imitating the amount and appearance of squirted silicone ejected in the calibrating exercise on the bolts being installed in the actual steelwork, the distribution of actual bolt tensions achieved are, to a high confidence level, (a) above the minimum required, and (b) not so much higher than the minimum as to approach the "caution" level which is close to the point where the bolt reaches maximum capacity and then begins to loose capacity. The SQUIRTER DTI's visual emission of elastomeric material, when correctly used as a measure of protrusion compression, is intuitive, is independent of language interpretation and therefore useable in many countries, and also allows bolt installers to see that they have correctly installed all of the bolts, and not missed some.

There are situations where it is desirable to know that bolt tension has surpassed a first level and reached some second level. U.S. Pat. No. 6,425,718, hereby incorporated by reference herein, describes a DTI having bumps (or protrusions) of multiple heights to indicate different bolt tensions. While well suited for its intended purpose, improvements may be made to the design in U.S. Pat. No. 6,425,718.

SUMMARY

An embodiment of the invention is a direct tension indicating washer includes a first surface having a plurality bumps formed thereon; a second surface having a plurality of discrete indentations, each indentation formed opposite one of said protuberances; an indicating material positioned in at least one indentations, the indicating material including an indicating material having a first color and an indicating material having a second color; and a channel leading from the at least one indentations to an outer edge of said direct tension indicating washer.

BRIEF DESCRIPTION OF THE DRAWINGS

FIG. 5 illustrates bolt tension versus bump compression when using the direct tension multi-color indicating washer shown in FIGS. 1-4.

DETAILED DESCRIPTION

Figure 1:
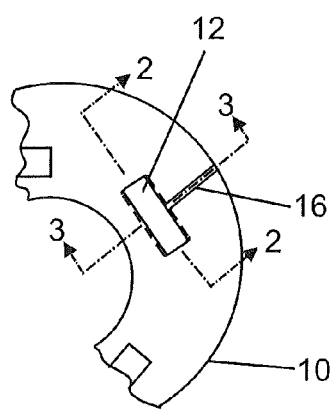
FIG. 1 is a bottom view of a portion of a direct tension multi-color indicating washer.
Figure 2:
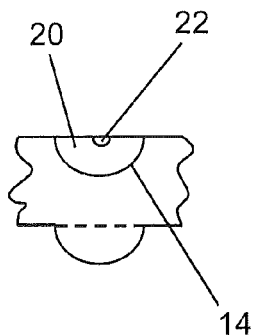
FIG. 2 is a cross-sectional view taken along line 2-2 of FIG. 1.
Figure 3:
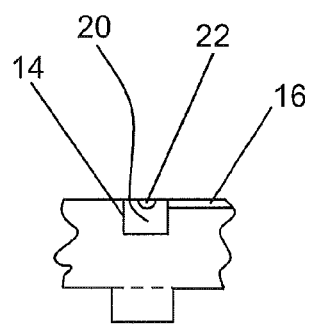
FIG. 3 is a cross-sectional view taken along line 3-3 of FIG. 1.
Figure 4:
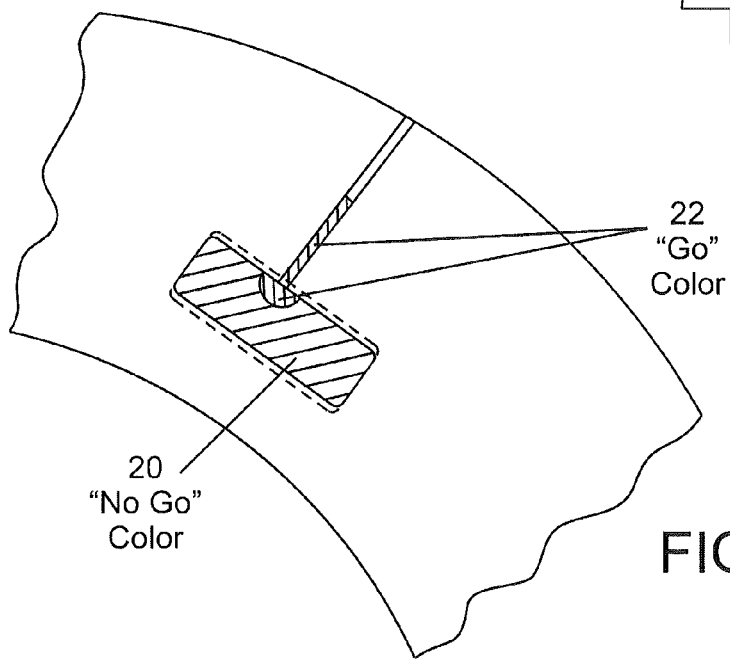
FIG. 4 is an enlarged bottom view of a portion of the direct tension multi-color indicating washer.

FIG. 1 is a bottom view of a bottom surface of a direct tension multi-color indicating washer 10 having bumps 12. The DTI 10 may be formed from metal as disclosed in U.S. Pat. No. 5,931,618. FIG. 2 is a cross-sectional view taken along line 2-2 of FIG. 1. FIG. 2 illustrates an indentation 14 formed under the bump 12 on a top surface of the DTI 10. FIG. 3 is a cross-sectional view taken along line 3-3 of FIG. 1. Evident in FIG. 3 is a channel 16 formed in the underside of the DTI 10. Channel 16 extends from the indentation 14 to an outer edge of the DTI 10, and provides a path for indicating material to travel from the indentation 14 to the outer edge of the DTI 10. FIG. 4 is an enlarged bottom view of a portion of the direct tension multi-color indicating washer.

As shown in FIGS. 2-4, the indicating material in indentation 14 includes a first indicating material 22 and a second indicating material 20. The first indicating material 22 is positioned in the channel 16 and partially in the indentation 14. The second indicating material 20 is located in the indentation 14. It is understood that the first and second indicating materials 22 and 20 may be located in positions other than those shown in FIGS. 2-4. The first indicating material 22 may be a first color (e.g., green) indicating that a desired minimum bolt tension has not been achieved. The second indicating material 20 may be a second color (e.g., orange/red) indicating that a desired bolt tension has been achieved.

FIG. 5 illustrates bolt tension versus bump compression when using the direct tension multi-color indicating washer shown in FIGS. 1-4. As shown in FIG. 5, the first indicating material 22 is forced through channel 16 and appears at the outside edge of the DTI for a range of first bolt tensions labeled as green. The second indicating material 20 forced through channel 16 and appears at the outside edge of the DTI for a range of first bolt tensions labeled as red. This results in more consistent bolt tension as the installer knows to continue through the green indicating material just until the red indicating material begins to show.

The indicating material is deposited in the indentations 14 in such a way that the first color to appear at the outer diameter is green, and the second color to appear is red (green meaning "keep tightening", red meaning "stop tightening"). Green and red (or bright orange) are universally recognized as the colors of "go" and "no-go". The installer then simply tightens continuously as green elastomeric material appears, but as soon as the first visual indication of red appears, the automatic reaction is to stop tightening. FIG. 5 also illustrates bump compression before and after tensioning of the bolt. The bump 12 initially has a height of H1 before compression. After tensioning the bolt to the calibrated level, the residual height of bump 12 is H3, which is typically higher than bump compression in conventional SQUIRTER DTI designs.

Since the deposition of elastomeric material must be done with a very high degree of accuracy from one part to the next part within a "lot" or "batch" of parts of the same diameter and strength grade, so the emergence of elastomeric material is coincident with the correct amount of bolt tension, in the "go, no-go" DTI it is important that each color be deposited in precise quantities (e.g., weight, volume) and positions. It is also important that the viscosity and curing characteristics of the two elastomeric materials be designed to prevent undue missing of the first indicating material and the second indicating material.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A direct tension indicating washer comprising:
a first surface having a plurality of separate, discrete protuberances formed thereon;
a second surface having a plurality of separate, discrete indentations, each indentation formed opposite and beneath one of said protuberances;
a plurality of channels, each channel associated with a different one of the indentations;
a first channel of the plurality of channels leading from a first indentation of the plurality of indentations to an outer edge of said direct tension indicating washer;
a first indicating material having a first color, the first indicating material positioned in at least one of the first channel and the first indentation; and
a second indicating material having a second color different than the first color, the second indicating material positioned in the first indentation.

2. The direct tension indicating washer of claim 1 wherein: the first indicating material is positioned in the first channel and the first indentation prior to compression of the protuberance.

3. The direct tension indicating washer of claim 1 wherein: the amount and location of the first indicating material is established such that the first indicating material is forced through the first channel to the outer edge when a first bolt tension is achieved.

4. The direct tension indicating washer of claim 3 wherein: the first bolt tension is a minimum bolt tension.

5. The direct tension indicating washer of claim 3 wherein: the first bolt tension is within a range of minimum bolt tensions.

6. The direct tension indicating washer of claim 1 wherein: the amount and location of the second indicating material is established such that the second indicating material is forced through the first channel to the outer edge when a second bolt tension is achieved.

7. The direct tension indicating washer of claim 6 wherein: the second bolt tension is a desired bolt tension.

8. The direct tension indicating washer of claim 6 wherein: the second bolt tension is within a range of desired bolt tensions.

9. A direct tension indicating washer comprising:
a first surface having a plurality of separate, discrete protuberances formed thereon;
a second surface having a plurality of separate, discrete indentations, each indentation formed opposite and beneath one of said protuberances;
a plurality of channels, each channel associated with a different one of the indentations;
a first channel of the plurality of channels leading from a first indentation of the plurality of indentations to an outer edge of said direct tension indicating washer;
a first indicating material having a first color, the first indicating material positioned in at least one of the first channel and the first indentation; and
a second indicating material having a second color different than the first color, the second indicating material positioned in the first indentation;
the amount and location of the first indicating material is established such that the first indicating material is forced through the first channel to the outer edge when a first bolt tension is achieved, the first bolt tension being within a range of minimum bolt tensions;
the amount and location of the second indicating material is established such that the second indicating material is forced through the first channel to the outer edge when a second bolt tension is achieved, the second bolt tension is within a range of desired bolt tensions.

10. A method of installing a direct tension indicating washer comprising:
placing the direct tension indicating washer over a bolt, wherein the direct tension indicating washer includes:
a first surface having a plurality of separate, discrete protuberances formed thereon;
a second surface having a plurality of separate, discrete indentations, each indentation formed opposite and beneath one of said protuberances;
a plurality of channels, each channel associated with a different one of the indentations;
a first channel of the plurality of channels leading from a first indentation of the plurality of indentations to an outer edge of said direct tension indicating washer;
a first indicating material having a first color, the first indicating material positioned in at least one of the first channel and the first indentation; and
a second indicating material having a second color different than the first color, the second indicating material positioned in the first indentation attaching a nut to the bolt;
tightening the nut until the first indicating material emerges from the outer edge of the direct tension indicating washer, emergence of the first indicating material indicating that one of a minimum bolt tension and a range of minimum bolt tensions has been achieved; and continuing tightening the nut until the second indicating material emerges from the outer edge of the direct tension indicating washer, emergence of the second indicating material indicating that one of a desired bolt tension and a range of desired bolt tensions has been achieved.

* * * * *